United States Patent Office 3,658,795
Patented Apr. 25, 1972

3,658,795
WATER-SOLUBLE COATING COMPOSITIONS
Wolfgang Daimer, Graz, Austria, assignor to Vianova
Kunstharz Aktiengesellschaft, Vienna, Austria
No Drawing. Filed July 14, 1969, Ser. No. 841,619
Claims priority, application Austria, July 24, 1968,
A 7,146/68
Int. Cl. C08g 37/16; B01k 5/00
U.S. Cl. 260—839                           11 Claims

ABSTRACT OF THE DISCLOSURE

Coating compositions characterized in that they are water-soluble upon neutralization comprising (A) a reaction product of a diene polymer and an alpha, beta ethylenically unsaturated carboxylic acid and/or a dicarboxylic acid and/or an anhydride and/or a semi-ester and/or a semi-amide thereof containing carboxyl groups; and (B) a heat-reactive condensation product of formaldehyde with phenol carboxylic acids are described. The compositions, while being quick drying, are not overly sensitive to oxidation.

FIELD OF INVENTION AND PRIOR ART

This invention is directed to protective coatings and, more particularly, to coating compositions which are water soluble upon neutralization. These coatings comprise a blend of diene polymer-unsaturated carboxylic acid adduct, a heat-reactive condensation product of formaldehyde and a phenol carboxylic acid.

French Pat. Nos. 1,467,595 and 1,509,692 disclose the reaction of polymers of dienes, particularly of butadiene, with maleic anhydride, and the rendering of these reaction products water-soluble by neutralization with a base. In general, coating compositions produced from such materials have the disadvantage of extremely high oxygen reactivity. Thus, on the one hand, paints based on such materials tend to skin on storage to a great extent, and on the other hand, the paint films applied from such paints exhibit insufficient through drying due to the very rapid hardening of the surface which results in lack of the required adhesion. The consequences are that the films are very sensitive to mechanical influences and do not have adequate corrosion resistance.

To avoid this extremely high oxygen reactivity, U.S. Pat. No. 3,351,675 suggests a maleinized hydrocarbon co-polymer which is extended with a non-heat reactive phenolic resin. The phenolic resin, in this case, is so inactive that it will not contribute to the hardening of the film. British Pat. No. 1,107,147 reduces the highly unsaturated character of diene polymer adducts which is the cause of the very high oxygen reactivity through partial hydrogenation. The hydrogenation is carried out at pressures of between 5 and 50 atü., in organic solvents, with the co-employment of solid state catalysts. It is evident that this procedure requires expensive equipment. Moreover, the organic solvent and the catalyst have to be removed from the hydrogenated adducts before they can be further processed to form water-soluble coating compositions.

OBJECTS AND GENERAL DESCRIPTION OF THE INVENTION

Accordingly, it is an object of the present invention to provide coating compositions which are not overly sensitive to oxygen.

It is a further object of the present invention to provide coating compositions for electrodeposition which exhibit excellent salt spray and corrosion resistance and adhesion.

It is a further object of the present invention to provide coating compositions with excellent corrosion resistance on metal substrates without pre-treatment.

Briefly, the present invention relates to coating compositions comprising the following components:

(A) a reaction product of a diene polymer with an alpha, beta ethylenically unsaturated carboxylic acid and/or dicarboxylic acid and/or anhydride and/or semi-ester and/or semi-amide thereof which contains carboxyl groups, and (B) a heat-reactive condensation product of formaldehyde with phenol-carboxylic acid.

Condensate B can be etherified and/or include a condensation product of formaldehyde and a phenol if desired. Moreover, the coating composition can optionally include (C) a polyhydroxy compound with at least two hydroxyl groups and a molecular weight of between 50 and 3,000, and (D) condensation products of formaldehyde with ureas and/or aminotriazines which may or may not be etherified.

The components of the coating can, if desired, be chemically combined through careful condensation by heating at temperatures up to about 150° C. A chemical combination is particularly advisable if components B, C, or D have limited or no solubility in water.

Component A provides rapid cure characteristics, whereas component B has the effect of stabilizing the coating compositions against oxidative influences and will cause an initial delay in the drying of the surface and, thus, improves flow and through hardening of the films.

The water-soluble coating compositions of the invention can be applied by all common methods, pigmented or unpigmented. Particularly upon anodic deposition, the films obtained from the coating compositions of the invention show extremely improved corrosion resistance to salt spray and to an industrial atmosphere. A sphecial advantage of the present product is the fact that the corrosion and salt spray resistance is equally good on metal substrates which have not undergone a pre-treatment. Thus, complicated phosphatizing and chromatizing procedures can be omitted in the mass production of metal objects.

Examples of suitable components A are the reaction products of diene polymers with maleic acid, maleic anhydride, maleic acid semi-ester, maleic acid monoamide, and itaconic acid. Suitable diene polymers are obtained from 1,3-butadiene and/or 2-methylbutadiene-1,3 and/or 2,3-dimethylbutadiene-1,3 and/or chloroprene, and the like, optionally with other copolymerizable monomers, such as styrol, alpha-methylstyrol, ortho-meta-, or para-chlorostyrol, vinylnaphthalene, vinylcyclohexane, vinylcyclohexene, vinylacetate, (meth)acrylic acid esters, (meth)acrylnitrile, and the like. The polymers have molecular weights of from about 200 and 20,000 and contain isolated double bonds which can optionally be partially hydrogenated. The preparation of these diene homo- and co-polymers is known in the art.

Preferred compounds for use as component B are resol carboxylic acids such as those obtained in known manner through condensation of formaldehyde with phenol carboxylic acids, i.e., compounds containing a carboxyl group and a phenolic hydroxyl group, e.g., 2-(4-hydroxyphenyl)-2-(carbäthoxyphenyl)propane, 4,4-bis(4-hydroxyphenyl), pentanoic acid, or paracarbäthoxyphenol, optionally after partial or complete etherification of the methylol groups. Condensation products of formaldehyde with phenols, e.g., para-tertiary butyl phenol, 2,2 - bis - (4-hydroxyphenyl)-propane, can be co-employed, optionally after etherification with low molecular weight alcohols.

Suitable components C are compounds which have such a low volatility at the hardening temperatures of the coating compositions that they will contribute to the formation of a hardened coating. Examples of such organic compounds are ethylene glycol, propylene glycol, butylene glycol, neopentyl glycol, glycerol, trimethylolpropane, pentaerythritol, and derivatives of ethers of diphenylolpropane and epichlorohydrin without epoxy groups, e.g., their partial esters with fatty acids. Furthermore, amine alcohols, e.g., triethanolamine, N,N,N',N'-tetrakis-(2-hydroxypropyl)-ethylene diamine, polymers containing hydroxy groups, as are obtained e.g. by co-polymerization of allyl alcohol or (meth)acrylic acid monoethylene glycol ester, optionally in conjunction with other alpha, beta ethylenically unsaturated monomers (such as styrol, vinyl toluol, (meth)acrylic acid ester, vinyl acetate, (meth)acrylamide, (meth)acrylnitrile) or by reaction of ethylene oxides with pre-formed polymers carrying carboxy groups can be employed. Special properties of the final products are obtained, if the polyhydroxy compounds are reacted with isocyanates such that these components C contain at least two hydroxy groups. If the high molecular component C has limited or no water solubility, it can be carefully condensed with component A and/or B in order to form coating compositions which are clearly soluble in water upon neutralization.

Suitable components D are condensation products of formaldehyde with urea, thiourea, melamine, benzoguanamine, etc., which can be partially or completely etherified with low molecular weight alcohols. When such components D are co-employed, the stoving temperatures can be reduced.

Suitable bases for neutralizing the described reaction products are ammonia, primary, secondary, and tertiary alkyl amines, e.g., (iso)propylamine, butyl amine, amyl amine, diethyl amine, diisopropyl amine, dibutylamine, morpholine, piperidine, trimethylamine, triethylamine, and the alkanol amines, e.g., diisopropanol amine, dimethyl ethanol amine, and alkylene polyamines, e.g., ethylene diamine, diethylene triamine, triethylene tetramine, etc. When using the coating compositions of the present invention as binders in electrodeposition processes, alkali and/or alkaline earth hydroxides and the salt of acids having a dissociation constant lower than that of the resins can be selected in the neutralization, provided they form water-soluble products with the latter. Examples of suitable salts of such weakly dissociated acids are the alkali carbonates and alkali carbamates.

Examples of suitable water-tolerant solvents which can be employed in the coating compositions are alcohols such as methanol, ethanol, (iso)propanol, (iso)-butanol, sec. butanol, tert. butanol; semi-ethers of glycols, e.g., ethylene glycol monomethylether, ethylene glycol monoethyl ether, ethylene glycol mono(iso)propyl ether, ethylene glycol monobutyl ether; and keto-alcohols, e.g., diacetone alcohol.

SPECIFIC EMBODIMENTS

The following preparations of components and examples illustrate the invention without limiting its scope. All parts are by weight, if not otherwise stated.

Component A (1) To 400 g. polybutadiene having a viscosity of 5 p./20° C. and 80 percent cis-configuration 10 g. Cu-naphthenate solution in xylol (1 percent metal) and 100 g. maleic anhydride are added. The batch is heated to 190–220° C. and held at this temperature until the content of free maleic anhydride has fallen below 0.05 percent. After cooling to 100° C., the mass is diluted with 50 g. diacetone alcohol and hydrolyzed with 20 g. water for two hours at 95° C.

(2) At 130° C., the semi-ester is formed from 200 g. maleic anhydride and 95 g. ethanol. After addition of 10 g. Cu-naphthenate (1 percent metal), 400 g. polybutadiene having a viscosity of 5 p./20° C. and 80 percent cis-configuration are added continuously. The temperature is raised to 200° C., whereby 80 g. volatile matter will collect in the receiver. After 5 hours of reaction time, no free semi-ester can be traced. The batch is cooled to 100° C. and diluted with 60 g. diacetone alcohol. The adduct is hydrolyzed with 20 g. water for two hours at 95° C. and diluted to 70 percent solids with ethanol.

Component B (1) 360 g. formaldehyde, 36 percent, 106 g. triethyl amine and 286 g. 4,4-bis-(4-hydroxyphenyl)pentanoic acid are heated to 80° C. If necessary, the pH-value of the mixture is adjusted to 7.7–8.0 (measured 1:10 in distilled water). The mass is held at 80° C. for 10 hours and then cooled.

(2) 228 g. 2,2-bis-(4-hydroxyphenyl)-propane are dissolved in 500 ml. N–2 sodium hydroxide by warming. Then a solution of 110 g. sodium-monochloroacetate (technical) in 170 g. water is added. The temperature is slowly raised to 60–90° C. and is held for about one hour. The batch is stirred continuously. The acid number of the part of a sample which is freed from alkali by acidification and which is soluble in a mixture of toluol and butanol shows that about 85 percent of the bisphenol have reacted.

200 g. formaldehyde, 35 percent, are added to the mass and the resulting clear solution is held at about 40° C. for three days. The mixture of resols is precipitated with the calculated quantity of hydrochloric acid in the presence of 100 g. butanol. After several washings, about 500 g. of butanolic solution with an acid number of about 140 mg. KOH/g. are obtained. The solid content is about 65 percent. After neutralization with amomnia the solution is dilutable with water to any desired extent.

(3) Using an excess of sodium monochloroacetate over the theoretical amount, suitably preventing conditions which favor the undesired saponification of the chloroacetic acid or its sodium salt respectively, a substantially quantitative etherification of one phenolic hydroxy group of 2,2-bis-(4-hydroxyphenyl)-propane is achieved, such that substantially the sodium salt of diphenylol glycolic acid semiether is obtained. The ether is condensed with 175 g. formaldehyde as described in component B–2, and is further processed with 114 g. butanol or cyclohexanol. The condensate has an acid number of about 155 mg. KOH/g.

Instead of 2,2-bis-(4-hydroxyphenyl)-propane in component B–2 and B–3, other analogous bisphenols can be used which are obtained from higher ketones, such as methyl ethyl ketone, cyclohexanone, methylcyclohexanone, etc. Instead of an alkane radical, sulphur or sulphur dioxide may form the bridge in the bisphenol, or dioxydiphenyl may serve as the bisphenol. Additionally, the chloroacetic acid can be reacted with diphenols such as resorcinol, hydroquinone, or the like, to obtain a phenolcarboxylic acid for use herein.

EXAMPLE 1

A blend of 120 g. of component A–2 and 50 g. of component B–1 is diluted with 35 g. ethanol and the pH-value is adjusted to 6.5 with triethyl amine (measured on a 10 percent solution). The resin is diluted to a 10 percent solid content with distilled water. The diluted solution is placed in a 1.5 liter metal container, the container being wired as the cathode and a coating is deposited on an anode within the container having a 200 cm.$^2$ surface at a voltage of 100 volts over a duration of 1 minute at 25° C. On stoving (30 minutes/160° C.) a film of 20 microns results which provides outstanding corrosion resistance and excellent mechanical properties, also when deposited on nonpretreated steel plate.

EXAMPLE 2

570 g. of component A–1 are reacted with 30 g. of a co-polymer of allyl alcohol and styrol (e.g., RJ 100 of Monsanto Chemicals) with a molecular weight of about 1600 and an equivalent weight of about 300, the reaction being carried out at 110–115° C. for about one hour until a sample neutralized to a pH-value of 8 is clearly soluble in water. The batch is cooled to 80° C., then 180 g. ethylene glycolmonoethyl ether are added, and at 60° C. 50 g. of component B-1 and 50 g. of a water-soluble melamine resin at 60 percent non-volatile in diethylene glycol monoethyl ether. The melamine resin is prepared in known manner and container an average of 4 mols of formaldehyde and 3 mols of methanol per mol of melamine. After neutralization with triethyl amine to a pH-value of between 7.3–7.7 (measured on a 10 percent solution in distilled water), a pigmented paste is prepared with red iron oxide (pigment/binder ratio 1:1). The paste is adequately diluted with water and can be aplied as a coating by dipping, spraying or flow coating.

Films applied to non-pre-treated steel, stoved for 30 minutes at 140° C., show outstanding resistance to salt spray, industrial atmosphere, and humidity.

EXAMPLE 3

A blend of 570 g. of component A-1 and 300 g. of component B-2 is diluted with 240 g. ethylene glycol monoethyl ether and neutralized with triethyl amine to a pH-value of 7.0 (measured on a 10 percent solution in distilled water).

500 g. of the neutralized binder are ground on a triple roll mill with 40 g. titanium dioxide (Rutile type), 48 g. aluminum silicate and 3 g. carbon black. The paste is diluted with 2500 g. distilled water.

The diluted solution is placed in a metal container of 3 liters content, which is wired as the cathode and a dense film is deposited in a 200 cm.$^2$ degreased steel plate anode which is within the container from the paint bath at 25° C. within 1 minute at 150 volts. On stoving (30 minutes/150° C.) a smooth flexible film develops which imparts outstanding corrosion resistance to the coated metal. The salt spray resistance test according to ASTM B 117–61 proves this extraordinary protection. After 200 hours the corrosion on the scratch is only 2 mm. deep while the edges and the rest of the panel remain unaffected. It is noted that by either increasing the stoving temperatures or by pre-treating the metal by usual zinc phosphatizing or iron phosphatizing the same minimum effect of corrosion will occur only after 400 hours of salt spray. This proves the superiority of the fully synthetic compositions of the invention over known products based on natural raw materials.

Instead of component B-2, also component B-3 can be used. The properties of the obtained films are substantially analogous.

EXAMPLE 4

570 g. of component A-1 are reacted with 100 g. of a hydroxy rich partial ester (obtained by esterification of 135 g. of pentaerythritol and 300 g. rosin to an acid value of 5 mg. KOH/g.) at 120° C. until a sample neutralized with ammonia is clearly soluble in water. The reaction mass is diluted with 300 g. ethylene glycol monoethyl ether. Then 100 g. of component B-2 are added.

Pigmentation, neutralization, and dilution are carried out as described in Example 3, the neutralizing agent is ammonia.

The coatings exhibit very high throwing power and outstanding corrosion resistance. Thus, they are admirably suited for electrodeposition of complicated objects, e.g., car bodies and parts, for appliances or for other equipment which is also under constant strain of a corrosive atmosphere.

EXAMPLE 5

The improvement in the coating compositions of the invention over the prior art, which consists in coating compositions based on component A alone, is illustrated as follows:

Component A also is used to prepare an aqueous paint as described in Example 3. The paint is electrodeposited on degreased steel panels with the equipment described in Example 3. The conditions prevailing in the installations for electrocoating on industrial scale are imitated thus that the paint bath is stirred continuously and 2 or 3 panels are coated daily for a number of days. With progressing days of stirring, the changes in the appearance of the deposited and stoved films are observed. The results are set forth in Table I.

The tests show that component A alone in addition to having the worse adhesion from the beginning of the films, deteriorates very quickly in the deposition bath through the continuous contact with air oxygen which occurs in any electrocoating installation and cannot be prevented.

In contradistinction thereto, the paints based on the coating compositions of the present invention show an impressive increase of bath stability and of the quality of the deposited and stoved films.

TABLE I

| | First day | Second day | Third day | Fifth day | Tenth day | Fifteenth day |
|---|---|---|---|---|---|---|
| (I) | | Smooth, flexible film with good adhesion | | | | Flexible film with good adhesion, but slight orange peel. |
| (II) | | | | | | Do. |
| (III) | | | | | | Flexible film with good adhesion, but orange peel. |
| (IV) | Smooth flexible film with poor adhesion. | Flexible film, orange peel, poor adhesion. | Flexible film with marked roughness, pores down to the metal, poor adhesion. | Would not flow on stoving, test was ended. | | |

NOTE.—(I) Paint according to Example 1, component A+B. (II) Paint according to Example 3, component A+B. (III) Paint according to Example 4, component A+B+C. (IV) Paint based on component A alone.

It is claimed:

1. A coating composition characterized in that it is water soluble upon neutralization comprising
    (A) a reaction product of
        (a) a butadiene polymer of a member of the group consisting of butadiene - 1,3,2 - methylbutadiene - 1,3 and 2,3 - dimethylbutadiene - 1,3, said polymers having a molecular weight of from 200–20,000, and
        (b) an α,β-ethylenically unsaturated carboxylic acid or its anhydride, semi-ester, semiamide or mixtures thereof, the proportions of (a) and (b) being controlled to provide a reaction product carrying carboxyl groups, and
    (B) from about 8–40% of (A), calculated as solid substances, of a heat-reactive condensation product of formaldehyde with phenol carboxylic acids.

2. The composition of claim 1 wherein the butadiene polymers contain about 80% cis-configuration.

3. The composition of claim 1 wherein the α,β-ethylenically unsaturated acid is a dicarboxylic acid.

4. The composition of claim 1 wherein the α,β-ethylenically unsaturated carboxylic acid anhydride is maleic anhydride.

5. The composition of claim 1 wherein the methylol groups of (B) are etherified with low molecular weight alcohols.

6. The composition of claim 1 wherein component (B) includes condensation products of formaldehyde and in p-position hydrocarbon-substituted phenols.

7. The composition of claim 1 including a polyhydroxy component with at least two hydroxyl groups and a molecular weight of from 50–3000.

8. The composition of claim 1 including etherified and/or unetherified condensation products of formaldehyde with urea and/or aminotriazines.

9. The composition of claim 1 including water-tolerant solvents.

10. The composition of claim 1 wherein the components (A) and (B) have been heat-treated at temperatures of up to 150° C. to an ungelled compound which is water-soluble upon neutralization.

11. The process of electrodepositing the coating compositions of claim 1 upon a support.

References Cited

UNITED STATES PATENTS

| | | | |
|---|---|---|---|
| 2,981,710 | 4/1961 | Hoenel | 260—29.3 |
| 3,230,162 | 1/1966 | Gilchrist | 260—29.3 |
| 3,298,985 | 1/1967 | Bills et al. | 260—845 |
| 3,340,172 | 9/1967 | Huggard | 260—29.3 |
| 3,351,675 | 11/1967 | Gilchrist | 260—845 |
| 3,410,818 | 11/1968 | Yurlick et al. | 260—845 |

JOHN C. BLEUTGE, Primary Examiner

U.S. Cl. X.R.

204—181; 260—29.3, 32.8 R, 52.8 N, 33.2 R, 33.4 R, 840, 845, 846